United States Patent
Sugano et al.

(10) Patent No.: US 7,013,324 B1
(45) Date of Patent: Mar. 14, 2006

(54) METHOD AND SYSTEM DISPLAYING FRESHNESS OF OBJECT CONDITION INFORMATION

(75) Inventors: Hiroyasu Sugano, Kobe (JP); Satoshi Okuyama, Kobe (JP); Jun Kakuta, Akashi (JP); Madoka Mitsuoka, Akashi (JP); Tetsuji Morishita, Kobe (JP)

(73) Assignee: Fujitsu Limited, Kawasaki (JP)

( * ) Notice: Subject to any disclaimer, the term of this patent is extended or adjusted under 35 U.S.C. 154(b) by 530 days.

(21) Appl. No.: 09/610,983

(22) Filed: Jul. 6, 2000

(30) Foreign Application Priority Data

Jul. 9, 1999  (JP)  .................................. 11-195190

(51) Int. Cl.
*G06F 15/16* (2006.01)
(52) U.S. Cl. ..................................................... 709/203
(58) Field of Classification Search ................ 709/203, 709/217
See application file for complete search history.

(56) References Cited

U.S. PATENT DOCUMENTS

| | | | | |
|---|---|---|---|---|
| 5,809,446 A | * | 9/1998 | Visser et al. | 701/103 |
| 5,813,026 A | * | 9/1998 | Borg et al. | 711/115 |
| 5,974,262 A | * | 10/1999 | Fuller et al. | 710/18 |
| 6,035,304 A | * | 3/2000 | Machida et al. | 707/104.1 |
| 6,553,407 B1 | * | 4/2003 | Ouchi | 709/206 |

\* cited by examiner

*Primary Examiner*—David Y. Eng
(74) *Attorney, Agent, or Firm*—Staas & Halsey LLP

(57) ABSTRACT

A system and method transmitting and receiving condition information which changes from time to time from terminals connected to a network, monitoring the reliability of the condition information and displaying a display mode of the condition information depending on the reliability of the condition information comprising a freshness determination unit calculating freshness of the condition information from a difference between a time a terminal receives the condition information from other terminals through the network and a time the condition information is referenced by other terminals through the network and a display controlling unit determining depending on the freshness information determined by the freshness determination unit the display mode of the condition information, wherein the display unit displays the display mode of the condition information.

34 Claims, 14 Drawing Sheets

DIAGRAM ILLUSTRATING AN EXAMPLE
OF FRESHNESS LEVEL DETERMINING TABLE

|  | INITIAL TIME | 10 MINUTES LATER | 30 MINUTES LATER | AN HOUR LATER |
|---|---|---|---|---|
| FRESHNESS LEVEL | FRESHNESS 1 | FRESHNESS 2 | FRESHNESS 3 | FRESHNESS 4 |

FIG. 4

DIAGRAM ILLUSTRATING AN EXAMPLE OF THE
CONDITION INFORMATION STORED IN THE STORAGE UNIT

| USER ID | CONDITION | LATEST ACQUIRING TIME | FIRST ACQUIRING TIME |
|---|---|---|---|
| satomi@xxx.c | HAPPY | 19990601T144530Z | 19990601T144530Z |
| eri@friends.net | BUSY | 19990601T144530Z | 19990601T144530Z |
| kenta@buddy.c | ANGRY | 19990601T144530Z | 19990601T130000Z |

FIG. 11

DIAGRAM ILLUSTRATING AN EXAMPLE OF PROCESS OF THE OTHER EMBODIMENT OF THE PRESENT INVENTION STORING THE USER REFERENCE LIST

| USER ID | CONDITION | COMMENT | UPDATE TIME | REFERENCE USER LIST |
|---|---|---|---|---|
| satomi@xxxx.c | BUSY | VERY BUSY | 19990601T103051Z | suga@friends.net, kenta@mail.yyy.co.jp |
| eri@friends.net | HAPPY | HAPPY | 19990601T122346Z | |
| kenta@ml.yy.co | ANGRY | ANGRY | 19990601T110138Z | suga@friends.net |
| tohko@buddy.c | BUSY | WORKING | 19990601T140628Z | |
| ... | | | ... | |

FIG. 14

| | | NORMAL DISPLAY | FRESHNESS LEVEL | | | |
|---|---|---|---|---|---|---|
| | | | F1 | F2 | F3 | F4 |
| CONDITION INFORMATION | HAPPY | ☺ | ▦ | ⊗ | ⊗ | ☺ |
| | ANGRY | 😠 | ▦ | ▦ | ▦ | 😠 |
| | BUSY | (BUSY) | (BUSY) | (BUSY) | (BUSY) | (BUSY) |

| | | |
|---|---|---|
| ▦ ORANGE | ▦ DARK RED | ▦ DARK BLUE |
| ⊗ YELLOW | ▦ RED | ▦ BLUE |
| ⊠ LEMON | ▯ PINK | ▭ LIGHT BLUE |

FIG. 18

METHOD AND SYSTEM DISPLAYING FRESHNESS OF OBJECT CONDITION INFORMATION

This application is related to and claims priority to Japanese Patent Application No. 11-195190, filed Jul. 9, 1999 in Japan, the contents of which are incorporated herein by reference.

BACKGROUND OF THE INVENTION

1. Field of the Invention

The present invention relates to a method for improving the displaying of relevant information in a system having a function of acquiring and displaying condition or status information which changes from time to time such as the operating condition of a computer system or the like.

2. Description of the Related Art

With the development and popularization of networks and systems utilizing the networks, it is now possible for users to obtain necessary information by transmitting and receiving various pieces of information.

For example, in a whereabouts or location management system, information indicating user conditions which change from time to time is transmitted and received through a network.

In such a system, each user using a terminal connected to the network transmits to a relaying apparatus, such as a server, or directly to a terminal of another user, information indicating the user's conditions such as the user's destination, the user's current location, busy condition and feeling. A display system of the terminal may include a graphical user interface (GUI). Moreover, the user is capable of referencing the user condition information collected in the server (relaying apparatus) from each user through the network or the user condition information transmitted directly to the user terminal. For example, when the user is far away at a distant place or nearby, if transmission and reception of information are possible through the network, respective conditions of the user can be verified as if the user was nearby.

However, in the related art, only contents have been displayed when referencing information which changes from time to time such as displaying user condition information. Therefore, it has been difficult to determine when the user condition information has been updated or when this information has been acquired. Further, it has been difficult to determine the reliability of the information to which reference has been made.

It is very preferable particularly when communicating with users to recognize the user status. For example, to determine, depending on the condition of the user, whether a message should be transmitted to the user immediately by telephone or by electronic mail (E-mail) to be read later by the user. Therefore, whereabouts or location management systems have been proposed that transmit and receive through the network user conditions which change from time to time.

Moreover, not only the user or personal status but also a computer condition can also be considered as an object which changes from time to time.

Even in a system for monitoring the operating condition of a computer system, it is also possible in the same manner to collect conditions of network devices, lines and connected devices to monitor the conditions of devices existing not only in a visible or local area but also in a distant place.

In systems for referencing or accessing the user conditions which change from time to time, such as the whereabouts management system or the like explained above, when the information regarding user conditions is updated depending on change of user conditions, other users can always recognize the latest user conditions when referencing or accessing the user conditions. However, if, in spite of the change of user conditions, information indicating the user conditions are not updated, because the user has forgotten to make an update or system trouble has occurred, other users reference the conditions which are different from the current user conditions, resulting in erroneous recognition, further erroneous action or determination.

In such a system, since the user only obtains and displays the condition information recorded in the server or the like, only the contents of registered information can be recognized. Therefore, the user cannot determine the accuracy of the displayed information. As the solution, the registration time (update time) of information is stored when the condition information is registered and the registration time (update time) is displayed together when the condition information is displayed. However, the user can only recognize how long a time has passed from registration of information by recognizing the displayed update time and current time and then calculating difference between such times. Therefore, it is difficult for the user to determine the accuracy of information intuitively by observing the display of the registration (update time) and condition information.

On the other hand, in the whereabouts management system or the like explained above, to improve reliability of the information itself, a system has been realized which can automatically update the information regarding user conditions, in cooperation with a system for automatically detecting the attending place or location of users, depending on working conditions of users, even if the user does not directly update the information regarding the user's conditions.

However, at present, with development of network technology and substantial functions of portable terminals, such as hand-held terminals or the like, the user is now capable of enjoying various services not only by using various kinds of computer systems (or services) by connecting to a predetermined network in predetermined places but also by using a communication unit (communication mode) in the current place without selection of time and place.

Namely, it is now possible to use a computer with a desired communication unit at any time and in any place.

When the computer is used in such environments, a problem is then generated, because in the whereabouts management systems explained above, the user is not always connected to the whereabouts management system and therefore the user cannot always detect the latest condition of users collected in the whereabouts management system. Moreover, because such information changes from time to time as time passes the collected information will have lower accuracy or become erroneous.

For example, it is assumed that a certain user X obtains the conditions of user A and user B utilizing a hand-held terminal and stores the information of users A and B obtained in the hand-held terminal and thereafter leaves the office or house carrying the hand-held terminal.

Here, it is assumed, for example, that when the user X has obtained the condition information, the user A was attendant at his own seat in the office and the user B was taking part in a conference or meeting, and about an hour later, the user A went to business trip and the condition information of the user A was accordingly updated, meanwhile the user B was still attendant at the conference.

Here, it is also assumed, for example, that the user X recognizes or obtains the conditions of the users A and B using the hand-held terminal outside of the office. If connection to the whereabouts management system is possible from outside of the office, it is possible to obtain and display the changed latest conditions and it is also possible that conditions of the user A have changed to "business trip". However, if connection is impossible, the user X can reference only the information of the users A and B obtained an hour before (regarding the user A, before going to business trip). Therefore, the user X recognizes that the conditions of user A is still "attendance", even if the condition of user A has changed to "business trip".

This situation occurs even if it is possible to obtain and hold the information required by users, because as time passes changes in reliability of obtained information cannot be recognized or determined.

As user conditions always change, reliability of user condition information gradually deteriorate until the next user condition information update.

The users cannot understand the reliability of the condition information only by observing or recognizing the content of the condition information.

It is therefore an object of the present invention that upon referencing or accessing information which changes from time to time and collected in a system, a display mode is changed when displaying the collected information depending on the reliability of the information such that a user can recognize or observe at a glance contents of the collected information and the reliability of the contents.

SUMMARY OF THE INVENTION

The present invention is directed to a system and method for monitoring and displaying the reliability of information with the passage of time. By paying attention to the fact that the uncertainty of information which changes from time to time increases as time passes from a time the information was generated, the present invention determines a reference time for determining freshness (or timeliness) of the relevant information, calculates, at a time of making reference to the relevant information, the difference between a display time and the reference time, determines freshness of the information based on such calculated difference and displays the freshness information by changing a display mode depending on the determined freshness.

In particular, when a user registers or acquires condition information which changes from time to time, the reference time is set to determine reliability of such condition information and the time having passed from the reference time is calculated when the condition information is displayed. Depending on the period of time passage calculated, the display mode is updated allowing a user to recognize or observe at a glance superior or deterioration of reliability.

Therefore, the user can verify reliability of information which changes from time to time at a glance upon referencing or acquiring the same information for review or verification. Moreover, the user can accurately make determination or decisions and plan a schedule based on the relevant information.

BRIEF DESCRIPTION OF THE DRAWINGS

The present invention will be described further, by way of examples, with reference to the accompanying drawings, in which:

FIG. 4 is a diagram illustrating an example of the freshness level determination table.

FIG. 11 is a diagram illustrating an example of condition information to be stored in the storage unit.

FIG. 14 is a diagram illustrating an example of the condition information stored in the storage unit of the second embodiment of the present invention.

FIG. 18 is a diagram illustrating another example of display image of freshness display using color.

DESCRIPTION OF THE PREFERRED EMBODIMENTS

An example in which the present invention is applied to a user condition information management system for management of user conditions will be explained.

Figure 1:
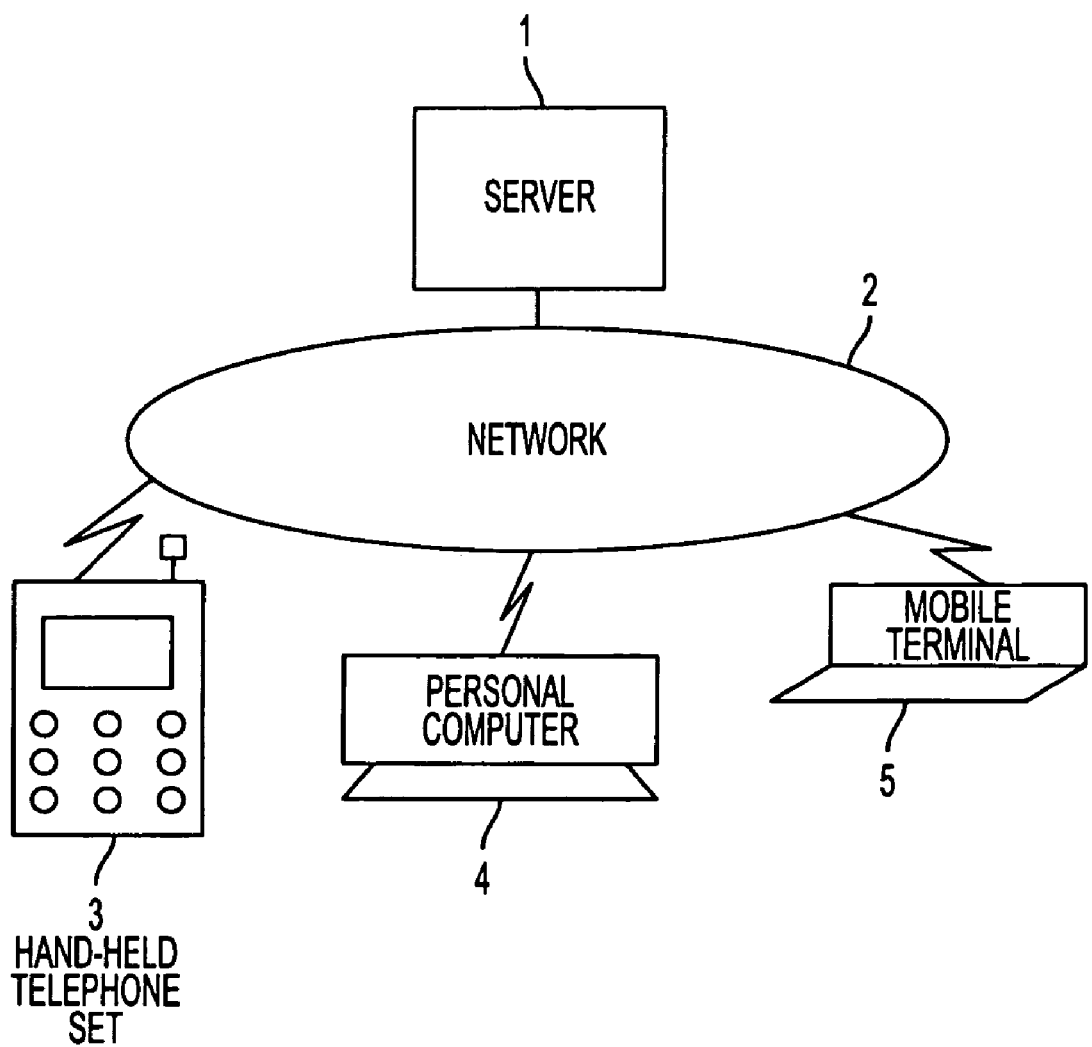
FIG. 1 is a diagram illustrating the configuration of the apparatus for the user condition information management system.

FIG. 1 illustrates an apparatus structure of a user condition management system.

This system is formed of a server 1 and a plurality of terminals 3, 4, 5 connected through various kinds of networks.

Here, the network 2 does not designate only one form but expresses the total network (telephone network, radio communication network, LAN, WAN, Internet, or the like) used for communicating, including the hand-held telephone set 3, personal computer 4 and mobile terminal 5.

The server 1 collects and accumulates information about conditions of users transmitted from terminals 3, 4, 5 and also transmits the collected user condition information to each user depending on a request from each user or in a predetermined timing.

The terminals 3, 4, and 5 set and detect the information about conditions of each user, transmit this information to the server 1 and display the user condition obtained from the server 1. Any type of device such as personal computer, hand-held telephone set or mobile terminal which may be connected to the network can be used as terminals 3, 4 and 5.

First Embodiment

Figure 2:
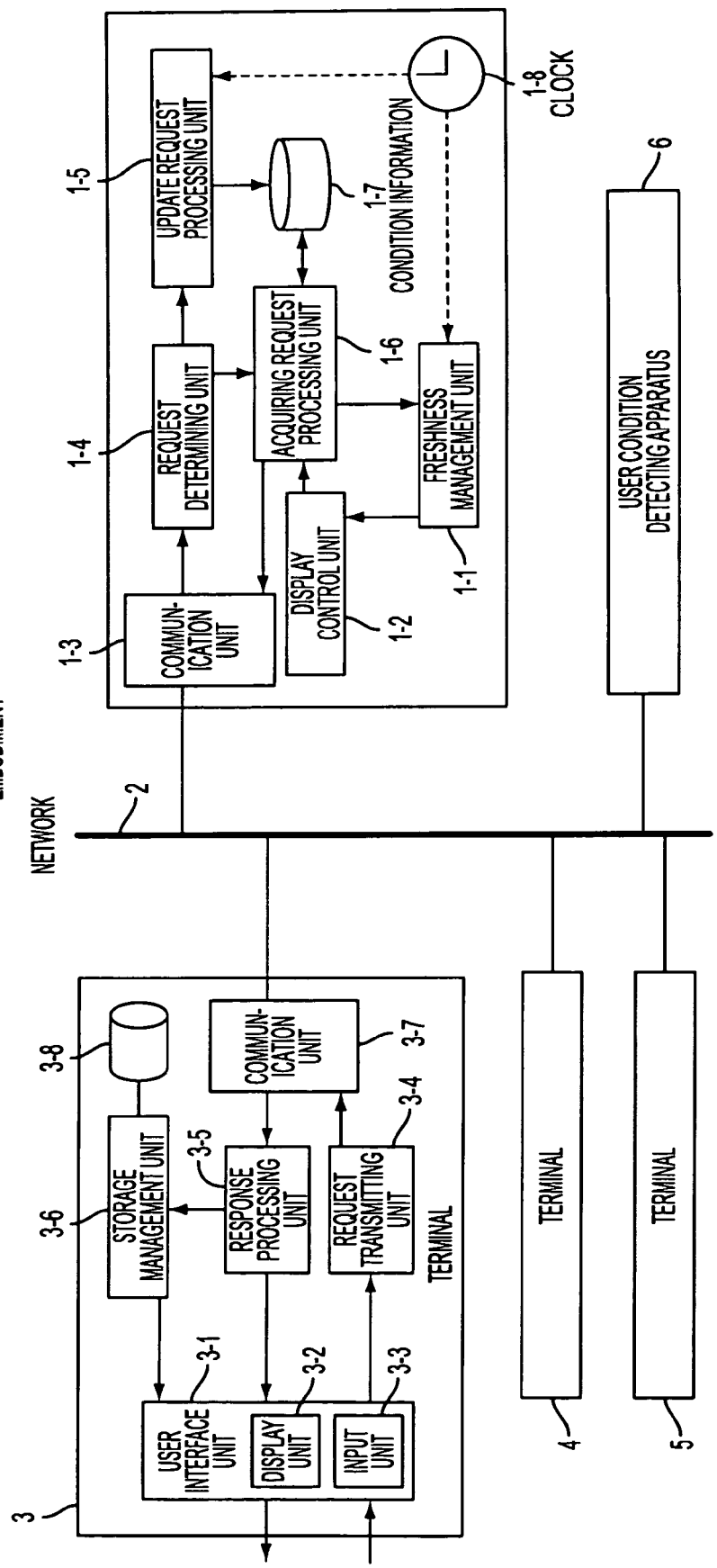
FIG. 2 is a diagram illustrating the system configuration of the first embodiment of the invention.

A system configuration of the first embodiment is illustrated in FIG. 2.

In the first embodiment, the server 1 includes a freshness management unit 1-1 and a display control unit 1-2. This configuration is just suitable when all processes are performed in the server and only transmission and reception of processed data are performed in the terminal side. For example, services by the condition information management system are provided through a web site on the Internet and the terminals 3, 4, 5 are provided with only general purpose browser software.

The server 1 further includes a communication unit 1-3 communicating through the network 2, a request determining unit 14 processing, depending on the type, a request from the terminals 3, 4, 5 received by the communication unit 1-3, an update request processing unit 1-5 processing an update request for updating the condition information, an acquiring request processing unit 1-6 processing an acquiring request of the condition information, a condition information database (DB) 1-7 storing the condition information, the freshness management unit 1-1 determining freshness information of the condition information by making reference to a clock 1-8, the display control unit 1-2 updating a display mode of the condition information depending on the freshness information, and the clock 1-8 metering the time.

The terminals 3, 4, 5 include a communication unit 3-7 communicating through the network 2, a request transmitting unit 3-4 transmitting the user condition information acquisition request to the server 1 through the communication unit 3-7, a response processing unit 3-5 processing a response to the user condition information acquisition request, a storage management unit 3-6 managing a storage device 3-8 and storing the condition information of users and a user interface unit (UI) 3-1 consisting of an input unit 3-3 accepting an input from the user and a display unit 3-2 displaying the user condition information.

A user condition detecting apparatus 6 is an independent apparatus detecting the attending place of the user and an apparatus included in a computer or provided in cooperation with a computer for detecting condition of the user. This apparatus may be replaced with an existing apparatus and is not the essential portion of the present invention. Therefore, detailed explanation of this user condition detecting apparatus 6 is omitted here.

First, the processing flow of the server 1 when it has received the information about user conditions will be explained. The communication unit 1-3 connected to the network 2 receives the user condition information update request from the terminals 3, 4, 5 or from the apparatus 6 detecting the user condition information and then transfers this request to the request determining unit 1-4. The request determining unit 1-4 recognizes that this request is the condition information update request and transfers the condition information update request to the update request processing unit 1-5. Upon reception of this request, the update request processing unit 1-5 acquires the current time from the clock 1-8 and causes the condition information DB 1-7 to store the current time as a pair with the condition information as the update time of the condition information.

Figure 3:
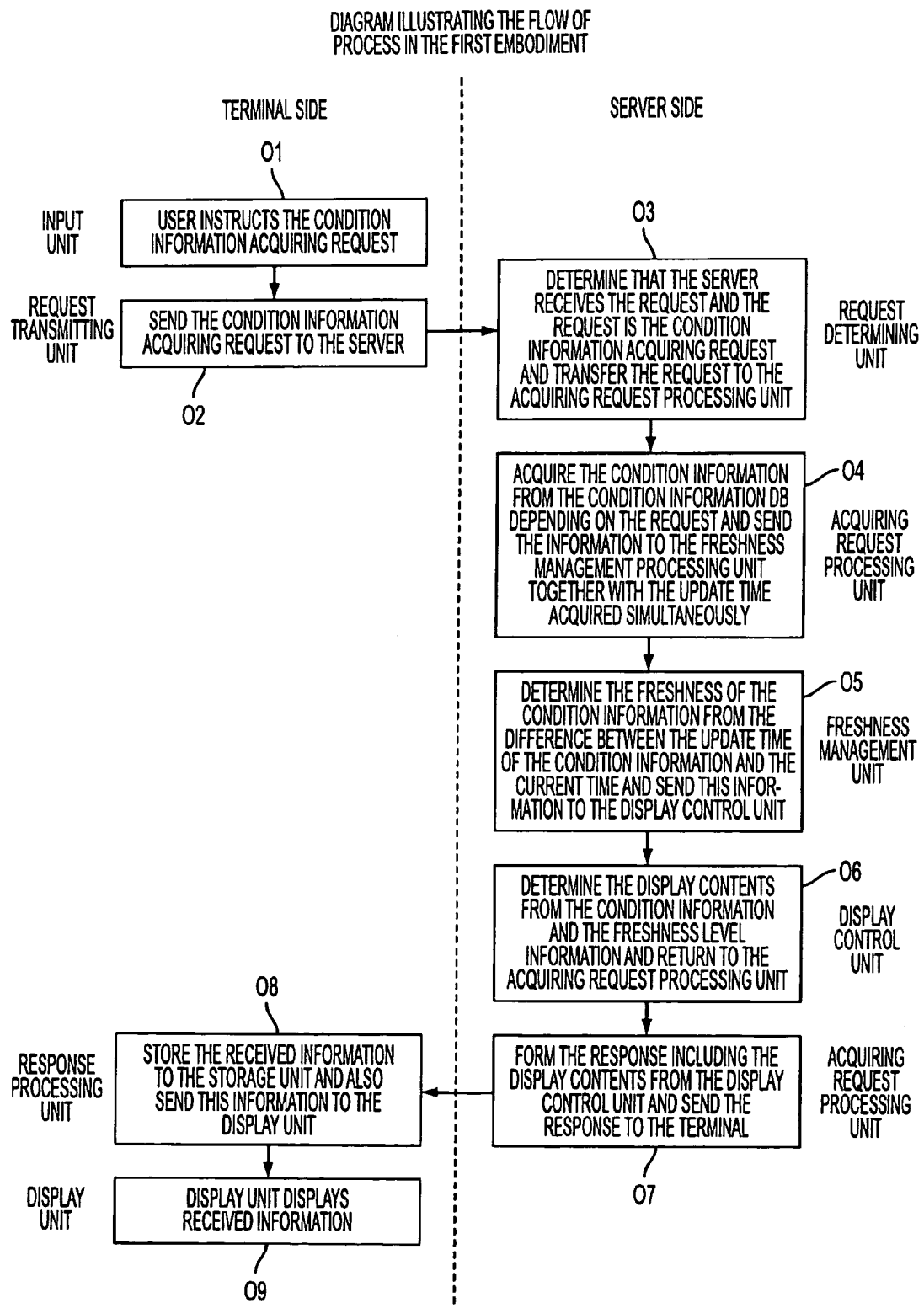
FIG. 3 is a diagram illustrating the flow of process in the first embodiment of the invention.

The processing flow for referencing the user condition information to which the present invention is applied will be explained with reference to FIG. 3. When the user using the terminal 3 requests the acquisition of the condition information of other users (O1 of FIG. 3) through the input unit 3-3, the condition information acquiring request is sent to the request transmitting unit 3-4 and then transmitted to the server 1 through the network 2 through the communication unit 3-7 (O2 of FIG. 3). The communication unit 1-3 of the server 1 receives the condition information acquiring request transmitted through the network 2 and then transmits the condition information acquiring request to the request determining unit 1-4. When the request determining unit 1-4 determines that the relevant request is the condition information acquiring request, it transmits the condition information acquiring request to the acquiring request processing unit 1-6 (O3 of FIG. 3). The acquiring request processing unit 1-6 reads, from the condition information DB 1-7, the condition information about users requested based on the condition information acquiring request. At this time, the update time stored together with the condition information is also acquired simultaneously and it is transmitted to the freshness management unit 1-1 together with the condition information (O4 of FIG. 3). The freshness management unit 1-1 calculates the difference between a current time and the update time and determines the freshness of the condition information depending on a preset rule or algorithm (O5 of FIG. 3). Moreover, the display control unit 1-2 determines the display mode of the condition information by determining the contents to be displayed depending on the condition information and the freshness information and then transmits the display contents to the acquiring request processing unit 1-6 (O6 of FIG. 3). The acquiring request processing unit 1-6 forms a response, which includes the condition information, the freshness information and the display contents and transmits the response to the communication unit 1-3 and the communication unit 1-3 sends the condition information and freshness information to the terminals 3, 4, 5 having issued the acquiring request through the network 2 (O7 of FIG. 3).

The terminals 3, 4, 5 transmit the response including the condition information, the freshness information and the display contents and received through the communication unit 3-7 to the response processing unit 3-5. The response processing unit 3-5 causes the storage unit 3-8 to store the received response via the storage management unit 3-6 and simultaneously transmits the information received in the response to the display unit 3-2 (O8 of FIG. 3) and the display unit 3-2 displays the condition information in the display mode depending on the freshness information and the display contents (O9 of FIG. 3).

FIG. 4 illustrates an example of freshness determination by the freshness management unit 1-1 using a freshness level determination table. In this example, the freshness information is determined depending on the time passage from the time in which the condition information is set (update time). The freshness management unit determines whether or not the difference from the time when the condition information is set (update time) and the time when the condition information is displayed is within 10 minutes, greater than 10 minutes but within 30 minutes, greater than 30 minutes but within an hour and over an hour and the determination result is expressed by a freshness level such as freshness levels 1, 2, 3 and 4.

Figures 5, 6, 9:
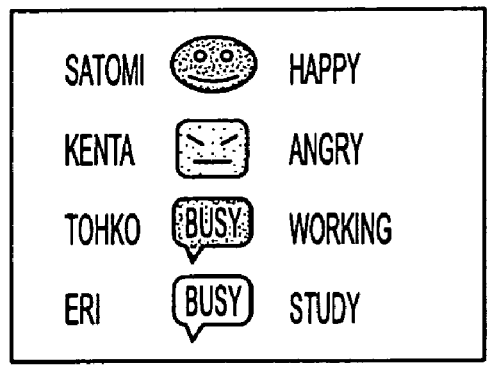
FIG. 5 is a diagram illustrating an example of the display mode table.
FIG. 6 is a diagram illustrating an example of display image of freshness display.
FIG. 9 is a diagram illustrating another example of the display mode table.

The display control unit 1-2 determines the display mode of the condition information depending on the condition information and the freshness levels. FIG. 5 illustrates an example of a table in which the display mode corresponding to the freshness level is set. In FIG. 5, three kinds of conditions, "happy", "angry" and "busy" indicating the feeling or condition of the user are indicated as the condition information of the user and these conditions are expressed in the display mode with a figure data (icon) to realize visual recognition. Here, the items expressing the feeling and condition of the users are never limited to the above example and various items such as "attendant", "absence", "business trip", "conference", "working" and "lecture" may also be used to express destination, whereabouts and feeling of the users.

In FIG. 5, concentration of the figure data indicating the condition information is changed depending on the freshness level. The freshness level "freshness 1" is most thick, which indicates the freshness level that the condition information has been just updated, and the condition information displayed as figure data becomes thinner as the freshness level deteriorates with passage of time such as "freshness 2", "freshness 3" and "freshness 4" in this sequence.

The display mode of the condition information displaying condition information as figure data (icon) and indicating the freshness level may be done by updating a bit map information or by preparing the bit map information corresponding to the freshness level and then selecting the bit map information depending on the freshness level.

FIG. 6 illustrates an example of display of the condition information of the users depending on the freshness level.

The freshness level of the condition information of users "SATOMI" and "TOHKO" is the freshness level 1, which indicates that a long time has not yet passed from update of the condition information. The freshness level of the condition information of user "KENTA" is the freshness level 3, which indicates that 30 minutes has passed from update of "KENTA"'s condition information. The freshness level of the condition information of user "ERI" is the freshness level 4, which indicates that 1 hour has passed from update of "ERI"'s condition information.

As explained above, the user can determine immediately the accuracy of condition information to which reference is made by observing at a glance the condition information displayed.

Second Embodiment

Figure 7:
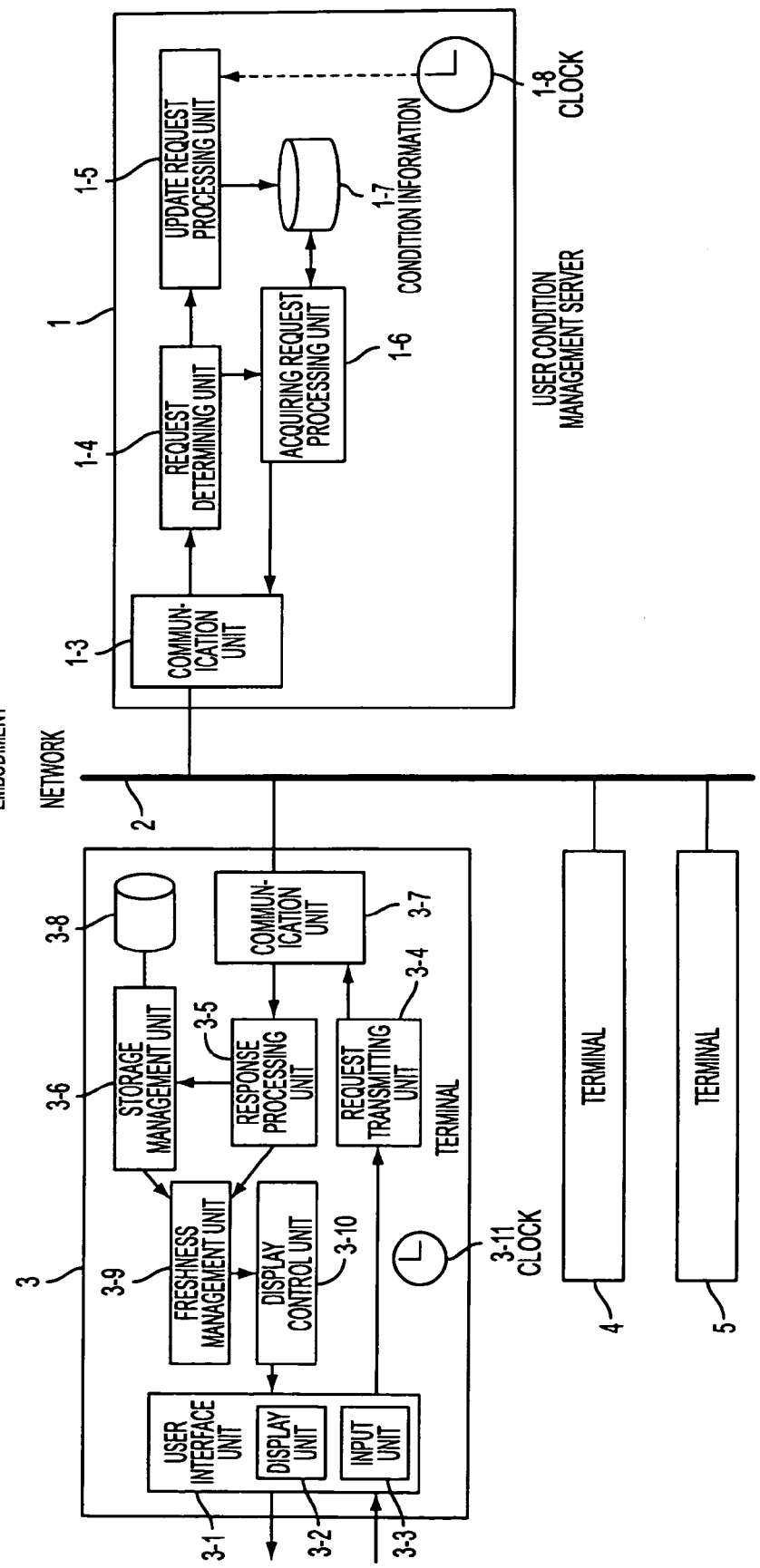
FIG. 7 is a diagram illustrating the system configuration of the second embodiment of the invention.

A system configuration in the second embodiment of the present invention is illustrated in FIG. 7. In the second embodiment, the freshness management unit 3-9 and the display control unit 3-10 are provided in the terminals 3, 4, 5 in place of the server 1. This configuration is an adequate example of the case in which the exclusive application software is installed in both the server 1 and the terminals 3, 4, 5 for respective processes by the server 1 and the terminals 3, 4, 5. For example, the system is configured as a discrete type system so that the server 1 has the function to receive and control the condition information of users transmitted from the terminals 3, 4, 5 and transmit the condition information of users depending on the request from the terminals 3, 4, 5, while the terminals 3, 4, 5 has the function to transmit the condition information to the server 1 and the function to display the condition information received.

In this configuration, only the condition information and additional information such as the update time added thereto are transmitted to the terminals 3, 4, 5 from the server 1 and thereby amount of data flowing through the network 2 can be reduced.

Moreover, since the display control unit 3-10 is provided in the terminals 3, 4, 5, the display mode can be selected in the terminal side to increase flexibility.

The process for storing the user condition information about condition to the condition information DB 1-7 is similar to that of the first embodiment and the explanation of this process will be omitted here.

Figure 8:
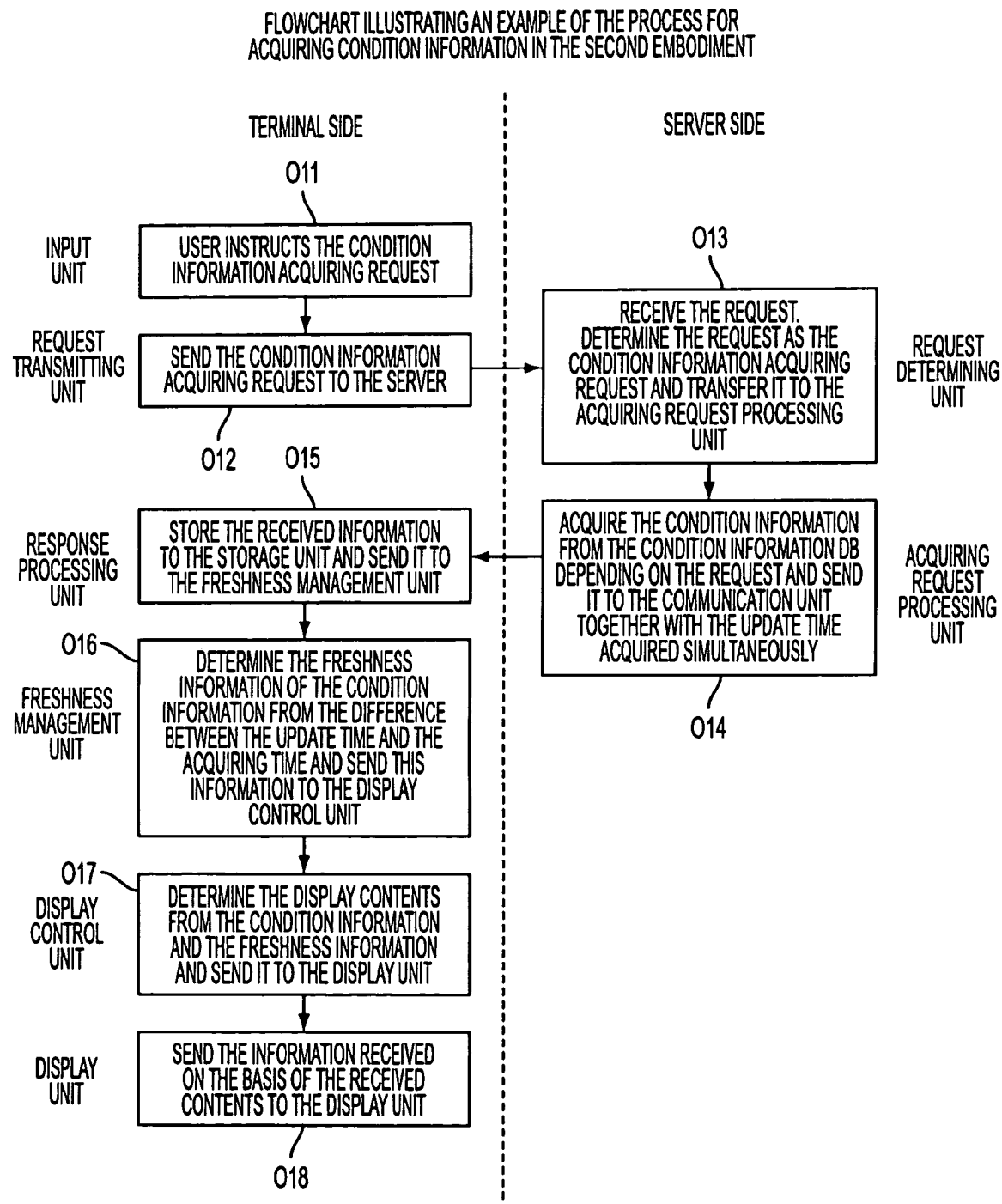
FIG. 8 is a diagram illustrating the flow of process in the second embodiment of the invention.

In this system configuration, the process for making reference to the condition information will be explained with reference to FIG. 8. When the user using the terminal requests to acquire condition information about the other users via the input unit 3-3 (O11 of FIG. 8), the condition information acquiring request is sent to the request transmitting unit 34 and then transmitted to the server 1 through the network 2 via the communication unit 3-7 (O12 of FIG. 8). The communication unit 1-3 of the server 1 receives the condition information acquiring request transmitted through the network 2 and then transmits the condition information acquiring request to the request determining unit 1-4. When the request determining unit 14 determines the request is the condition information acquiring request, it transmits the condition information acquiring request to the acquiring request processing unit 1-6 (O13 of FIG. 8). The acquiring request processing unit 1-6 reads from the condition information DB 1-7 the condition information about the user requested by the condition information acquiring request. In this case, the update time stored together with the condition information is also acquired simultaneously and this update time is transmitted together with the condition information to the terminals 3, 4, 5 via the communication unit 1-3 (O14 of FIG. 8).

The terminals 3, 4, 5 transmit the condition information and the update time received by the communication unit 3-7 to the response processing unit 3-5. The response processing unit 3-5 causes the storage unit 3-8 to store the received condition information and the update time via the storage management unit 3-6 and simultaneously transmits the condition information and the update time to the freshness management unit 3-9 (O15 of FIG. 8) and the freshness management unit 3-9 calculates the difference between the current time and the update time and determines freshness of information depending on the preset rule or algorithm (O16 of FIG. 8). Moreover, the display control unit 3-10 determines the display mode of the condition information by determining the contents to be displayed depending on the condition information and the freshness information and then transmits the display contents to the display mode to the display unit 3-2 (O17 of FIG. 8). Here, the freshness management unit is integrated with the display control unit and therefore the display content may be directly updated in a certain case by a preset rule or algorithm. The display unit 3-2 displays the condition information in the display mode determined by the display control unit 3-10 (O18 of FIG. 8).

Above example assumes that the terminals 3, 4, 5 request the condition information from the server 1 and display the same information.

When the terminals 3, 4, 5 are provided with the freshness management unit 3-9 and the display control unit 3-10, the following method can also be applied as a method of determining the freshness information and a method of updating the display mode of the condition information.

In the above example, when the condition information is requested from the server 1, both the condition information and the update time can be acquired, but it is also possible that only the condition information is transmitted to the terminal depending on the disclosing level of the condition information in the server 1 or because the update time is never stored in the server 1. In this case, upon reception of the condition information from the server 1, the response processing unit 3-5 sets a receiving time as a reference time for determination of the freshness information (hereinafter referred to as the latest acquiring time) and records the condition information and the latest acquiring time to the storage unit 3-8 and also transmits the condition information and the latest acquiring time information to the freshness management unit 3-9. The freshness management unit 3-9 determines the freshness of the condition information based on the difference between the latest acquiring time and the current time.

Moreover, the latest condition information cannot always be obtained at the time of referencing the user condition information. For example, it is assumed that the user acquires the condition information using the portable terminal such as the hand-held telephone set 3 and the mobile terminal 5 before going to business trip and thereafter the user goes to the business trip by carrying the terminal. When the user references the condition of users during the business trip, if connection to the server 1 is possible, the latest condition information may be acquired and displayed in the sequence explained above. But, if connection to the server 1 is impossible, display may be done based on the condition information stored in the terminal. In this case, when the user using the input unit 3-3 references the condition information, it is determined whether or not connection to the server 1 is possible. When connection to the server 1 is impossible, the condition information and the latest acquiring time stored in the storage unit 3-8 are transmitted to the freshness management unit 3-9. The freshness management unit 3-9 determines the freshness of the condition information from the difference between the latest acquiring time and the current time and transmits the condition information and freshness information to the display control unit 3-10.

Thereby, even if the latest condition information cannot be acquired, display can be made according to the freshness of the condition information based on the condition information stored in the terminal and the latest acquiring time information. The user can therefore recognize the content and reliability of the stored condition information only by observing the display on the display area without memorizing the time when the condition information was acquired.

Moreover, when the terminal has the display control unit 3-10, the display mode of the freshness information can be set for each user. When the server 1 is provided with the display control unit, the display mode of the condition information may be performed for all the users at the same time based on the freshness information and the display mode determined in the server 1. Further, different freshness information can be determined for each user by setting for each user the interval of time passage in the freshness level determination table illustrated in FIG. 4.

Figures 10, 13, 16:
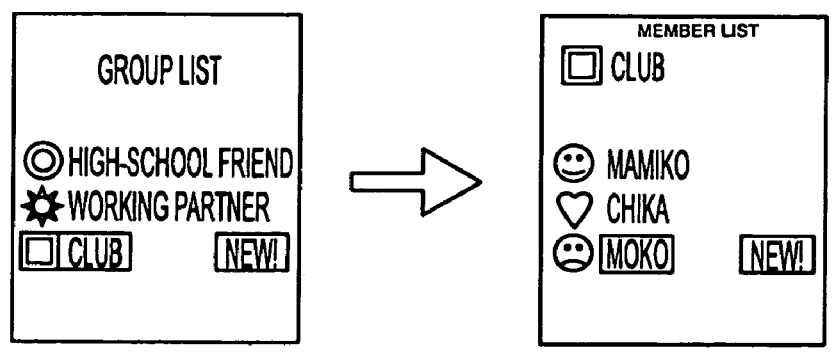
FIG. 10 is a diagram illustrating another example of the display mode table.
FIG. 13 is a diagram illustrating another example of display image of freshness display.
FIG. 16 is a diagram illustrating another example of display image of freshness display.

In the same manner as illustrated in FIG. 5, freshness of condition information can be displayed in the display mode depending on a request by the users setting the display mode for each user depending on the freshness level. FIG. 9, FIG. 10 and FIG. 18 illustrate other examples of the display modes corresponding to the freshness level. FIG. 9 illustrates an example for gradually making smaller the size of the icon of the condition information depending on the freshness level. FIG. 10 illustrates an example in which the display mode of icon of the condition information is never updated and a mark indicating the freshness level is added to the upper right side of icon and thereby concentration of the added mark is changed depending on the freshness level. FIG. 18 illustrates an example for gradually changing the color of the icon of the condition information depending on the freshness level.

According to the second embodiment if the update time cannot be acquired from the server 1 or when the server 1 does not store the update time at the time when the condition information has been acquired, the freshness information can be determined based upon the condition information stored in the terminals 3, 4 and 5 and by setting a time when the condition information is received as the reference time (the latest acquiring time) using the clock function 3-11 of the terminals 3, 4 and 5. In this case, it is possible to display multiple freshness levels determined from various points of views of the acquired condition information.

An application example of the second embodiment will be illustrated below.

Figure 12:
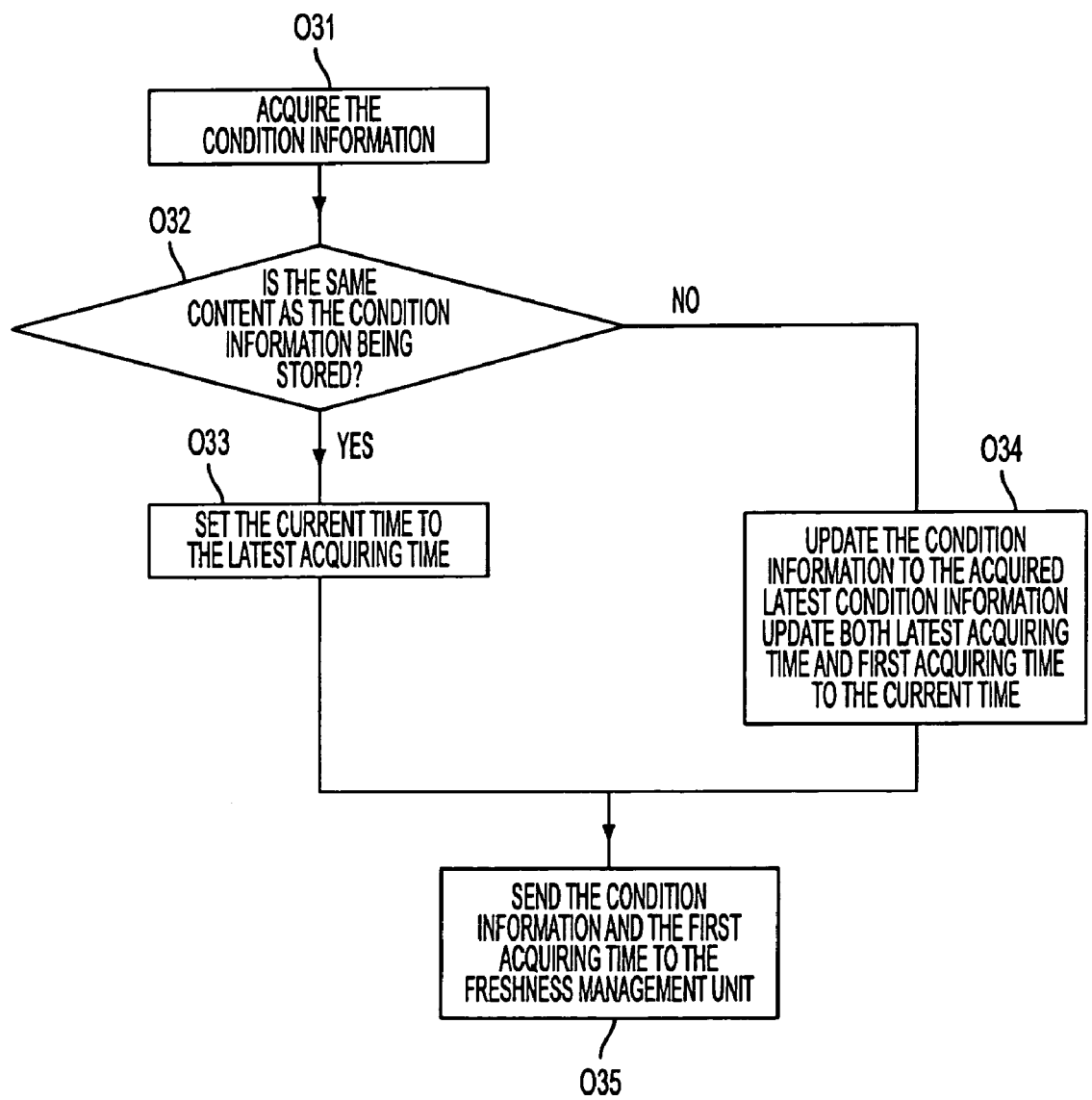
FIG. 12 is a diagram illustrating an example of the flow of process in the freshness management unit of the second embodiment of the invention.

(1) In the embodiments explained above, the terminal acquires only the condition information from the server 1 and determines the time when the information is received or acquired as the reference time for determining freshness information. However, in this case, freshness of the condition information is always displayed as the latest even if the condition information is not yet updated each time when it is acquired. Therefore, in order to prevent this, a function is added to update the reference time for determining freshness information. Not only the acquiring time for the acquired condition information but also a time when the same contents as the relevant condition information is first acquired (hereinafter referred to as the first acquiring time) is also stored in the storage unit 3-8. FIG. 11 illustrates an example of the condition information in a table stored in the storage unit 3-8 for this process. FIG. 12 illustrates the process using such table. Upon reception of the condition information (O31 of FIG. 12), the terminal compares the newly acquired condition information with the condition information stored in the storage unit 3-8 to determine whether or not the newly acquired condition information matches the condition information stored in the storage unit 3-8 (O32 of FIG. 12). If the condition information match or are identical, the latest acquiring time is updated to the current time (O33 of FIG. 12). If the condition information do not match or are different, the condition information in the storage unit 3-8 is replaced with the newly acquired condition information and the latest acquiring time and the first acquiring time are updated to the current time (O34 of FIG. 12). The condition information and the first acquiring time are transmitted to the freshness management unit 3-9. The freshness management unit 3-9 determines the freshness information with reference to the first acquiring time. This avoids updating the freshness information each time the condition information is acquired even if contents of the condition information are never updated. A user can recognize that the condition information is not updated for a long time if the updated condition information is never sent from the server and can determine that reliability of the condition information being displayed may be low.

(2) In the case where the condition information and the update time can be acquired by the terminal from the server and the time when the condition information is acquired in the terminal side is also acquired (the latest acquiring time), the terminal stores in the storage unit 3-8 the condition information, the update time acquired from the server and the time when the condition information is acquired. It is possible for the freshness management unit 3-9 not only to determine the freshness information from the difference between the update time stored in the server and the current time but also to determine respective freshness information from the difference between the update time acquired from the sever and the latest acquiring time and the difference between the latest acquiring time and the current time, thereby providing the capability to display the display mode of the condition information depending on any freshness information among these freshness information or to display the display mode of the condition information by combining these freshness information.

The method of displaying the freshness information depending on the difference between the update time and the current time is effective for verifying freshness of the condition information itself. For the method of displaying the freshness information depending on the difference between the latest acquiring time and the current time, it is enough to verify the condition information when the request is generated and this method is effective for the case wherein the freshness of the condition information itself is not required to be considered but the time passage from the time when the condition information has been acquired can be recognized. The method of displaying, in combination, the freshness information depending on the difference between the update time and the current time and the freshness information depending on the latest acquiring time and the current time is effective for the case wherein the condition information is recognized or evaluated to determine whether it is reasonable or not, depending on freshness of the condition information itself and depending on whether or not a long time has passed from the time when the information has been acquired (from the latest acquiring time) even when the condition information is never updated.

In another application example, it is also possible to verify by recognizing or observing, at a glance, which users have referred to the condition information by providing a function that stores if the user has referred to the condition information. FIG. 13 illustrates a display example of this embodiment. A mark "NEW!" is added to the icon indicating the condition information of the users "TOHKO" and "ERI". This mark indicates that the user has referred this condition information for the first time.

In this case, as illustrated in FIG. 14, not only the condition information of the user and the update time but also the users having referred to the condition information are stored in correspondence to the condition information in DB 1-7. Upon reception of the acquiring request from the terminal, the acquiring request processing unit 1-6 refers to the condition information DB 1-7 and stores the information for identifying the user who has issued the request in a list of the users who have referenced the condition information (reference user list). Moreover, upon reception of the acquiring request from the terminal, the acquiring request processing unit 1-6 determines whether or not the user who has issued the request is registered by referring to the reference user list. When the user is not registered, information indicating non-reference is transmitted together with the condition information and when the user is registered, the information indicating that reference has been made is transmitted together with the condition information.

The display control unit of the terminal determines not only the display mode of the freshness information determined by the freshness management unit but also the display mode of the non-reference/reference information.

Third Embodiment

Figure 15:
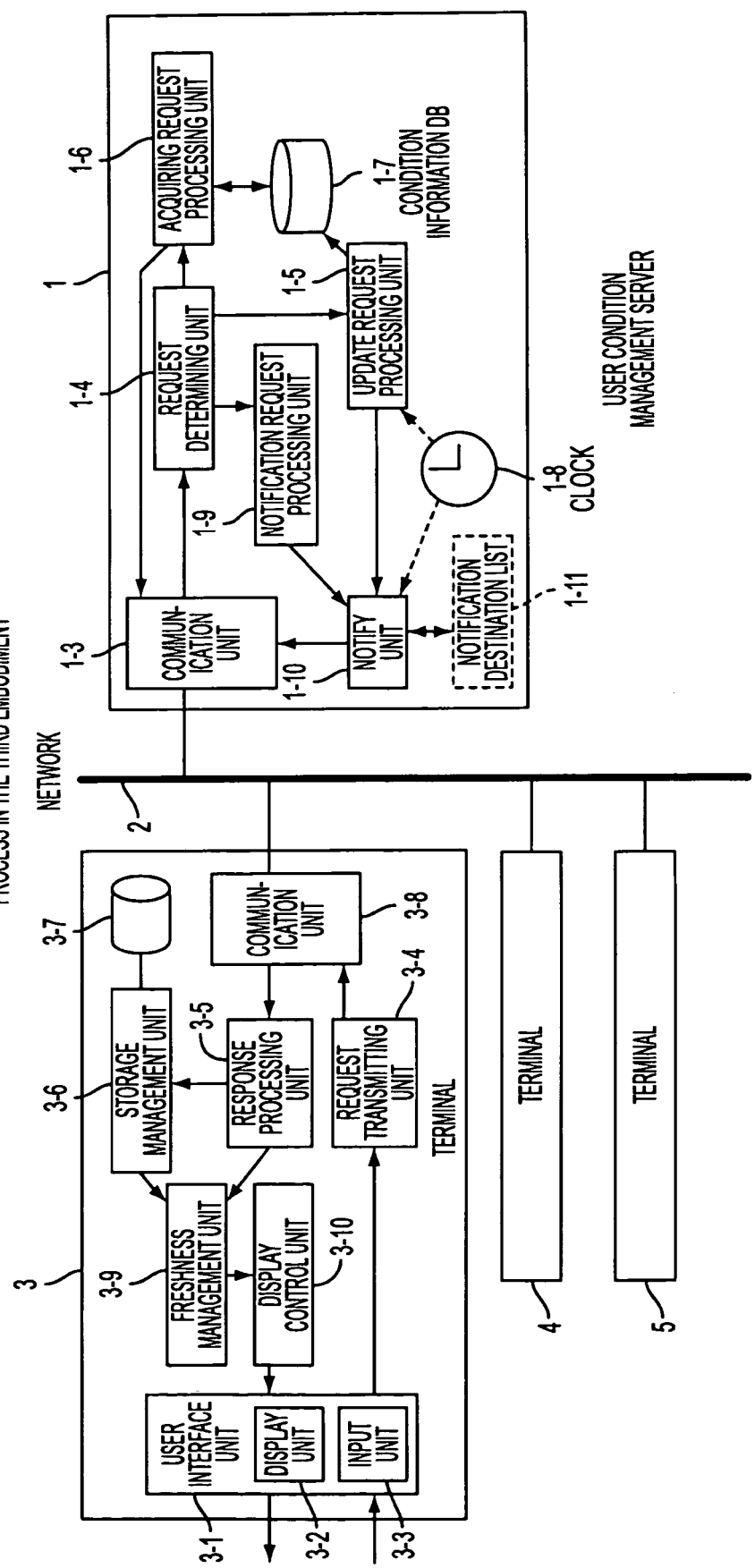
FIG. 15 is a diagram illustrating the flow of process in the third embodiment.

FIG. 15 illustrates the system configuration of the third embodiment. In the first and second embodiments, the condition information is acquired from the terminals 3, 4, 5 but, in this embodiment, the server 1 notifies change of user conditions to the terminals 3, 4, 5. In this embodiment, moreover, as in the case of the second embodiment, the freshness management unit and the display control unit is provided in the terminals 3, 4, 5.

To notify the terminal of changes in the condition information, the server 1 is provided with a notification request processing unit 1-9 and a notify unit 1-10. The notification request processing unit 1-9 receives a condition information notification request from the terminal and registers this request as a notification destination in a notification destination list 1-11 for use when the condition information is changed. The notify unit 1-10 receives a notification message for change of condition information and notifies the terminal of the changed condition information based on the notification destination list 1-11. The notification destination list 1-11 is formed of a correspondence table to indicate which user will be notified when the condition information of a certain user is changed. The terminal via the input unit 3-3 instructs the condition information notification request and the request transmitting unit 34 transmits to the server 1 via the communication unit 3-8 the condition information notification request, including information of users who desire to receive condition information notification.

The request determining unit 1-4 of the server 1 receives the condition information notification request via the communication unit 1-3 and then transmits the condition information notification request to the notification request processing unit 1-9. The notification request processing unit 1-9 stores the corresponding users included in the condition information notification request and the users having issued the condition information notification request in the notification destination list 1-11.

Explained next is the flow of process to notify change of condition information to a user who desires to receive notification when the condition information of a certain user has changed.

Here, it is assumed that the change of the user's condition information has been sent to the server 1 via the terminal. The update request processing unit 1-5 of the server 1 updates the condition information of the relevant user in the condition information DB 1-7 and the update time and simultaneously notifies the notify unit 1-10 that condition information has been updated. The notify unit 1-10 refers to the notification destination list 1-11 to determine whether or not there is a terminal to which the changed condition information of the user for whom the update has been generated should be notified. When there is a notification destination, the notify unit 1-10 transmits the notification message to the relevant terminal. Here, it is assumed that the update time is included in addition to the new condition information in the contents of the notification message. When the terminals 3, 4, 5 of notification destination and the server 1 are in the communication ready condition, the notification message is quickly transmitted to the terminals and the response processing unit 3-5 processes the notification message. The freshness management unit 1-9 and the display control unit 3-10 determine the freshness information based on the condition information and the update time transmitted from the server 1 and the display mode of the condition information depending on the determined freshness information.

Here, it is important to determine which reference time to use for determining the freshness information. When the time period from the time the condition information changes until the notification message is received by the terminal is comparatively short, namely when there is little difference between the update time of the condition information and the latest acquiring time at the terminal, the time passage up to the current time may be determined by using either the update time or the latest acquiring time as the reference time. However, when the difference is comparatively large due to congestion of the network, it is preferable to determine the freshness information based on the difference from the update time. Moreover, it is also possible, as illustrated in the second embodiment, to display, through combination, the freshness information determined depending on the update time and the freshness information determined depending on the latest acquiring time.

Moreover, when the terminal and server are not always in the communication ready condition like the hand-held telephone network, a notification message storing unit which stores temporarily the notification message may further be provided in the server side. In this case, when it is detected by a certain means that the notification destination terminal and the server are in the communication ready condition, the notification message stored in the notification message storing unit is transmitted to the notification destination terminal. Since the update time is provided together with the condition information in the notification message, the freshness information can be determined with reference to the update time even if difference between the time the notification message is transmitted to the terminal and the update time is large. Therefore, even in this case, the user can detect or observe, by his sense, how long ago the condition information was changed.

Other Embodiments

In the above embodiments, an example for displaying the condition information to each user has been explained. However, it is also possible to incorporate the present invention in a system which can process a plurality of users in a predetermined group unit.

FIG. 16(a) illustrates an example in which the condition information of the grouped users is displayed for each group. Each group corresponds to a plurality of users. In FIG. 16(a), the mark "NEW!" is displayed at the side of a group name "CLUB". It means that condition information has been changed in any user belonging to the group "CLUB". In FIG. 16(a), when the group "CLUB" is selected, "MAMIKO", "CHIKA", "MOKO" belonging to the group are displayed. A "NEW!" mark is displayed to the user "MOKO" and thereby it can be verified that condition of "MOKO" has been updated.

Figure 17:
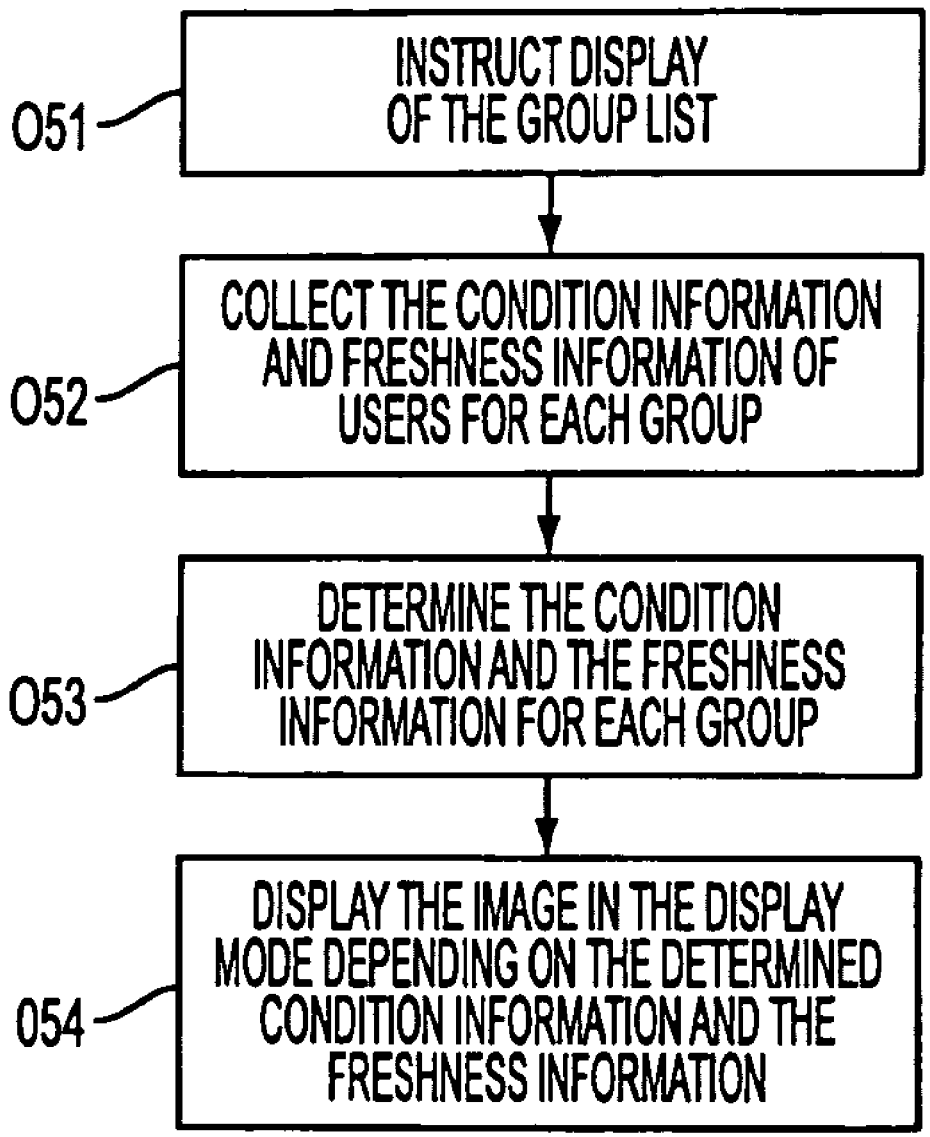
FIG. 17 is a flowchart illustrating contents of process for displaying freshness level of group.

FIG. 17 illustrates the flow of process for displaying the freshness information in the group unit. When display of the group is instructed (O51 of FIG. 17), condition information and the freshness information of the users of each group unit to be displayed are collected (O52 of FIG. 17). The condition information and the freshness information representing the group is determined for each group (O53 of FIG. 17). Here, when the function is provided to additionally display, as the freshness level, the mark "NEW!", which indicates that the condition information has not been referenced even once after the condition information has been updated, it is determined if the mark "NEW!" is additionally displayed as the freshness level of the group. Next, the display mode of the condition information and the determined freshness information is displayed (O54 of FIG. 17).

Next some methods for totalizing or calculating the freshness information of the condition information of the group or each user in the group will be described.

(1) The highest freshness level among the freshness levels of the users, namely the latest freshness of the condition information is determined as the freshness level of the group.

(2) An average freshness level of each user is determined as the freshness level of the group.

(3) Number of users for each freshness level is collected and the freshness level of the largest number of users is determined as the freshness level of the group.

This example is effective for the case where the interface for displaying the group list is provided. A user can verify the freshness of the condition information of the users in the group without individually verifying the condition information of the users of each group.

The preferred embodiments of the present invention have been explained considering the condition information of users as the example. However, the present invention is not limited only to the condition information of users and the present invention can easily be applied to any information which changes from time to time.

What is claimed is:

1. A method of displaying condition information which changes from time to time in a system transmitting and receiving the condition information from terminals connected to a network and displaying the condition information using a display unit, the system performing a process comprising:

storing a reference time for determining a freshness level of the condition information in a terminal which receives the condition information from other terminals through the network;

determining a visual freshness level of the condition information according to a determination of the freshness level of the condition information based upon said reference time and a visual freshness level determination table; and updating a display mode visually displaying the freshness level of the condition information based upon a visual representation of the condition information and the determined visual freshness level of the condition information, wherein the display unit displays the display mode of the condition information and a user can observe at a glance the freshness level of the condition information.

2. A method of displaying condition information as claimed in claim 1, wherein determining the freshness level of the condition information comprises:

calculating a difference between a time the terminal receives the condition information from the other terminals as the reference time and a time the other terminals reference the condition information in the terminal receiving the condition information; and determining the freshness level of the condition information depending upon a preset rule and the calculated difference.

3. A condition display system transmitting and receiving condition information which changes from time to time from terminals connected to a network and displaying the condition information using a display unit, comprising:

a storage unit storing a reference time for determining a freshness level of the condition information in a terminal which receives the condition information from other terminals through the network;

a visual freshness level determination unit determining a visual freshness level of the condition information according to a determination of the freshness level of the condition information based upon said reference time and a visual freshness level determination table, and updating a display mode visually displaying the freshness level of the condition information based upon a visual representation of the condition information and the determined visual freshness level of the condition information, wherein the display unit displays the display mode of the condition information and a user can observe at a glance the freshness level of the condition information.

4. A condition display system as claimed in claim 3, wherein the visual freshness determining unit determines the freshness level of the condition information by calculating a difference between a time the terminal receives the condition information from the other terminals as the reference time and the time the other terminals reference the condition information in the terminal receiving the condition information and determining the freshness level of the condition information depending upon a preset rule and the calculated difference.

5. A condition display system as claimed in claim 3, wherein as the visual freshness level, line widths of figure data corresponding to the display mode of the condition information are thick upon update of the condition information and line widths of the figure data are thinner as the freshness level deteriorates.

6. A condition display system as claimed in claim 3, wherein as the visual freshness level, size of figure data corresponding to the display mode of the condition information are large upon update of the condition information and size of the figure data are smaller as the freshness level deteriorates.

7. A condition display system as claimed in claim 3, wherein as the visual freshness level, a mark is added to each figure data corresponding to the display mode of the condition information and the mark is bold upon update of the condition information and the mark is lighter as the freshness level deteriorates.

8. A hand-held communication terminal connected to a network and automatically receiving through the network, at one of any time and in a predetermined timing, condition information automatically transmitted through the network from another terminal receiving the condition information from other terminals, at one of any time and in the predetermined timing, the hand-held communication terminal performing a process comprising:
 displaying a display mode of the condition information received through the network;
 determining a freshness level of the condition information;
 determining a visual freshness level of the condition information according to the determined freshness level of the condition information and a visual freshness level determination table; and
 updating the display mode visually displaying the freshness level of the condition information based upon the determined visual freshness level of the condition information to change the display mode visually displaying the freshness level of the condition information.

9. A hand-held communication terminal as claimed in claim 8, further comprising a process of determining a passage of time as the freshness level of the condition information by calculating a difference between a current time and a time the another terminal receives the condition information.

10. A hand-held communication terminal as claimed in claim 8, further comprising a process of determining a passage of time as the freshness level of the condition information by calculating a difference between a current time and a time the hand-held communication terminal receives the condition information.

11. A hand-held communication terminal as claimed in claim 8, further comprising a process of determining a passage of time as the freshness level of the condition information by calculating a difference between a time the another terminal receives the condition information and a time the hand-held communication terminal receives the condition information.

12. A hand-held communication terminal as claimed in claim 8, wherein the condition information is condition information of a user.

13. A hand-held communication terminal as claimed in claim 8, wherein the condition information is condition information of a group of users and users in the group.

14. A method of displaying condition information which changes from time to time in a condition information management system transmitting and receiving the condition information from terminals connected to a network, comprising:
 storing, in a terminal, the condition information received from other terminals;
 determining, in the terminal, display mode changing information controlling a display mode displaying the received condition information, according to a process comprising:
  determining a freshness level of the condition information by calculating a difference between a time the terminal receives the condition information from the other terminals and a time the terminal transmits the condition information to the other terminals,
  determining a visual freshness level of the condition information according to the determined freshness level of the condition information and a visual freshness level determination table,
  determining the display mode changing information to visually display a change in the freshness level of the condition information based upon the determined visual freshness level of the condition information, and
 transmitting automatically to the other terminals the condition information and the display mode changing information.

15. A method of displaying condition information as claimed in claim 14, wherein the terminal transmits automatically the condition information received by the terminal to the other terminals through the network upon receiving a condition information request from the other terminals.

16. A method of displaying condition information as claimed in claim 14, wherein the terminal transmits automatically the condition information received by the terminal to the other terminals through the network in a predetermined timing to a predetermined list of the other terminals.

17. A method of displaying condition information as claimed in claim 16, wherein the terminal storing the condition information receives from the other terminals a condition information notification request comprising terminal destinations and registers the terminal destinations included the request in the predetermined list of the other terminals.

18. A method of displaying condition information as claimed in claim 14, wherein the terminal transmits to the other terminals a time the terminal receives the condition information as the display mode changing information.

19. A method of displaying condition information as claimed in claim 14, wherein the terminal receives condition information of a user and the terminal transmits automatically the condition information of the user received by the terminal to the other terminals through the network upon receiving a condition information request from the other terminals, further comprising a process of:

storing identifying information of the user in a reference user list upon receiving the condition information request; and displaying a figure mark corresponding to the display mode of the condition information of each user depending on users in the reference user list issuing the condition information request.

20. A computer readable recording medium storing a program to control a system transmitting and receiving condition information from terminals connected to a network and displaying the condition information using a display unit, according to a process comprising:

storing a time a terminal receives the condition information from other terminals through the network;

determining a freshness level of the condition information according to said stored time to determine a freshness of the condition information at a time the other terminals through the network reference the condition information in the terminal receiving the condition information;

determining a visual freshness level of the condition information according to the determined freshness level of the condition information and a visual freshness level determination table; and updating a display mode visually displaying the freshness level of the condition information based upon a visual representation of the condition information and the determined freshness level of the condition information, wherein the display unit displays the display mode of the condition information and a user can observe at a glance the freshness level of the condition information.

21. A hand-held communication terminal connected to a network and automatically receiving through the network condition information automatically transmitted through the network from another terminal receiving the condition information from other terminals and the hand-held communication terminal displaying the condition information using a display unit, comprising:

a visual freshness determination unit determining a visual freshness level of the condition information received by the hand-held communication terminal through the network from the terminal, according to a process comprising:

determining a freshness level of the condition information;

determining the visual freshness level of the condition information according to the determined freshness level of the condition information and a visual freshness level determination table; and a display controlling unit controlling a display mode visually displaying the freshness level of the condition information based upon a visual representation of the condition information and the determined visual freshness level of the condition information, wherein the display unit displays the display mode of the condition information.

22. A hand-held communication terminal as claimed in claim 21, wherein the visual freshness determination unit calculates a difference between a current time and a time the another terminal receives the condition information for determining the freshness level of the condition information.

23. A hand-held communication terminal as claimed in claim 21, wherein the visual freshness determination unit calculates a difference between a current time and a time the hand-held communication terminal receives the condition information for determining the freshness level of the condition information.

24. A hand-held communication terminal as claimed in claim 21, wherein the visual freshness determination unit calculates a difference between a time the another terminal receives the condition information and a time the hand-held communication terminal receives the condition information for determining the freshness level of the condition information.

25. A hand-held communication terminal as claimed in claim 21, wherein the condition information is condition information of a user.

26. A hand-held communication terminal as claimed in claim 21, wherein the condition information is condition information of a group of users and users in the group.

27. A hand-held communication terminal as claimed in claim 21, wherein the hand-held communication terminal transmits a condition information request to the another terminal and the another terminal transmits automatically the condition information received by the another terminal to the hand-held communication terminal through the network upon receiving the condition information request from the hand-held communication terminal.

28. A hand-held communication terminal as claimed in claim 21, wherein the hand-held communication terminal automatically receives from the another terminal the condition information received by the another terminal through the network in a predetermined timing.

29. A hand-held communication terminal as claimed in claim 21, wherein the hand-held communication terminal transmits a condition information request to the another and the another terminal receives condition information of a user and the another terminal transmits automatically the condition information of the user received by the another terminal to the hand-held communication terminal through the network upon receiving the condition information request from the hand-held communication terminal, wherein the another terminal comprises an acquiring request processing unit storing identifying information of other users issuing condition information requests corresponding to the condition information of the user in a reference user list upon receiving the condition information requests from the other users and the another terminal references the reference user list and automatically transmits to the hand-held communication unit, in addition to the condition information of the user, the identifying information of the other users issuing the condition information requests corresponding to the condition information of the user; and wherein the display controlling unit determines a figure mark corresponding to the display mode of the condition information of each user, depending on the identifying information of the other users issuing the condition information requests corresponding to the condition information of each user, and the display unit displays the figure mark corresponding to the display mode of the condition information of each user.

30. A method of providing a display mode displaying condition information which changes from time to time in a condition information management system transmitting and receiving the condition information from terminals connected to a network, the method comprising:
   storing in a terminal a reference time corresponding to a time the terminal receives the condition information from another terminal; and
   changing the display mode displaying the condition information according to timeliness information of the condition information determined using the reference time and a rule and a determination of a visual freshness level of the condition information according to the timeliness information and a visual freshness level determination table.

31. A display, comprising:
   a programmed computer processor controlling the display according to a process comprising:
   determining a freshness level of the condition information;
   determining a visual freshness level of the condition information according to the determined freshness level of the condition information and a visual freshness level determination table; and
   visually displaying the freshness level of the condition information based upon a visual representation of the condition information and the determined visual freshness level of the condition information, wherein a user can observe at a glance the freshness level of the condition information.

32. A method of displaying on a screen of a computer terminal an awareness information of a person using other computer terminal connected to a network, the method performing a process comprising:
   storing a reference time for determining a freshness level of the awareness information in a terminal which receives the awareness information from other terminals through the network;
   determining a visual freshness level of the condition information according to a determination of the freshness level of the condition information based upon said reference time and a visual freshness level determination table; and
   displaying a display mode visually displaying the awareness information with a variable icon pattern according to said visual freshness level, wherein a user of said terminal can observe at a glance the freshness level of the awareness information.

33. A method of controlling a condition information which changes from time to time in a condition information management server transmitting and receiving the condition information from terminals connected to a network, comprising:
   storing in said condition information management server the condition information received from each of said terminals;
   determining display mode changing information controlling a display mode displaying the received condition information, according to a process comprising:
      determining a freshness level of the condition information,
      determining a visual freshness level of the condition information according to the determined freshness level of the condition information and a visual freshness level determination table,
      determining the display mode changing information to visually display a change in the freshness level of the condition information based upon the determined visual freshness level of the condition information, and
      transmitting automatically the condition information received by the condition information management server and the display mode changing information to control the display mode displaying the received condition information to the other terminals through the network.

34. A method of displaying condition information as claimed in claim 33, further comprising determining the freshness level of the condition information by calculating a difference between a time the condition information management server receives the condition information from each of said terminals and a time the condition information management server transmits the condition information to the other terminals.

* * * * *